United States Patent [19]
Ash et al.

[11] 3,920,003
[45] Nov. 18, 1975

[54] DETECTING SMALL POTENTIAL DIFFERENCES IN A MAMMALIAN BODY

[76] Inventors: Arthur Edward Michael Ash, Congdons Bridge, Cornwall; Jesse William Thomas Roope, 11 Park Ave. Potters Bar, Hertfordshire, both of England

[22] Filed: June 27, 1974

[21] Appl. No.: 483,556

Related U.S. Application Data

[63] Continuation-in-part of Ser. No. 318,083, Dec. 26, 1972, abandoned.

[52] U.S. Cl............................ 128/2.1 Z; 128/2.1 E
[51] Int. Cl.² ........................................... A61B 5/05
[58] Field of Search ........... 128/2.1 R, 2.1 Z, 2.1 C, 128/2.1 E, 2.06 E, 2 H, DIG. 4, 407–409, 2 R

[56] References Cited
UNITED STATES PATENTS

| | | | |
|---|---|---|---|
| 3,052,233 | 9/1962 | Veiling............................. | 128/2.1 R |
| 3,128,759 | 4/1964 | Bellis................................ | 128/2.1 R |
| 3,144,018 | 8/1964 | Head................................. | 128/2.1 R |
| 3,593,704 | 7/1971 | Schwab.............................. | 128/2 H |
| 3,606,881 | 9/1971 | Woodson ....................... | 128/2.06 E |
| 3,726,777 | 4/1973 | Macur............................... | 128/2.1 R |
| 3,749,089 | 7/1973 | Derr.................................. | 128/2.1 E |
| 3,844,276 | 10/1974 | McDougall....................... | 128/2.1 E |

FOREIGN PATENTS OR APPLICATIONS

| | | | |
|---|---|---|---|
| 1,126,634 | 9/1968 | United Kingdom.............. | 128/2.1 R |
| 109,175 | 11/1939 | Australia............................ | 128/407 |

OTHER PUBLICATIONS

Edmonds et al., "Simple Millivoltmeter and Electrode, ... Potential in Man," Med. & Biol. Eng., Vol. 8, No. 4, pp. 409–410, 1970.

*Primary Examiner*—Richard A. Gaudet
*Assistant Examiner*—Lee S. Cohen
*Attorney, Agent, or Firm*—Foster York

[57] ABSTRACT

The invention relates to apparatus for detecting, amplification and identification of the polarity of low potential differences in a mammalian body, including a differential amplifier, two trigger units connected to the output of the amplifier, one trigger unit being adapted to be actuated by potentials greater than a threshold which is positive with respect to ground and the other trigger unit being adapted to be actuated by potentials less than a threshold and which are negative with respect to ground, and an indicator means connected to each of the trigger units to indicate when the associated trigger unit has been actuated.

5 Claims, 8 Drawing Figures

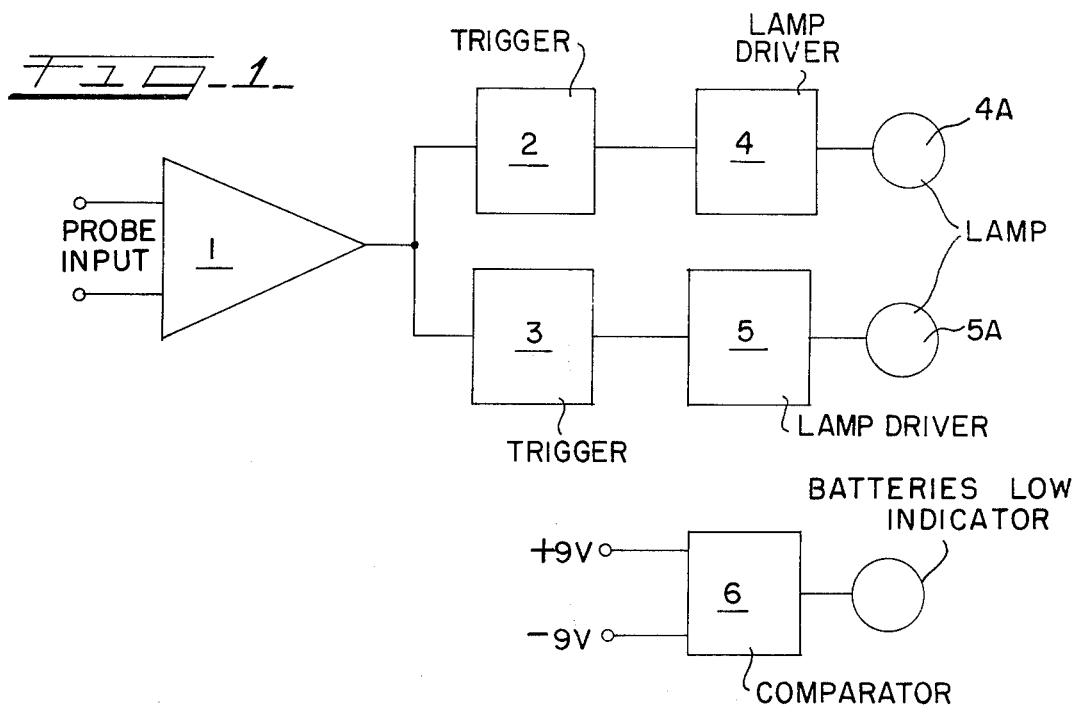
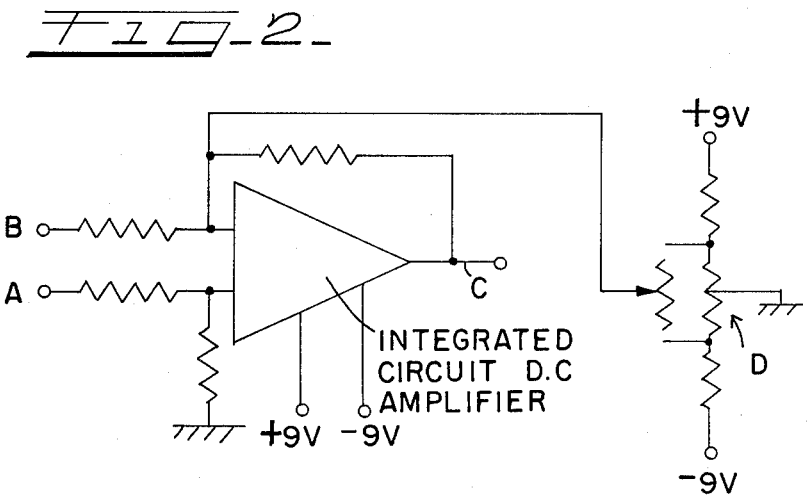
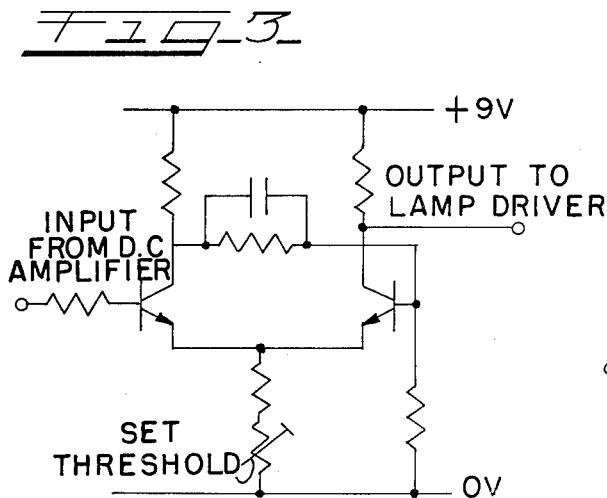
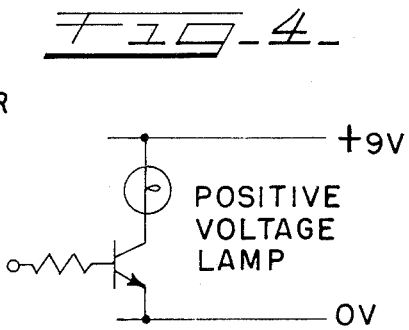

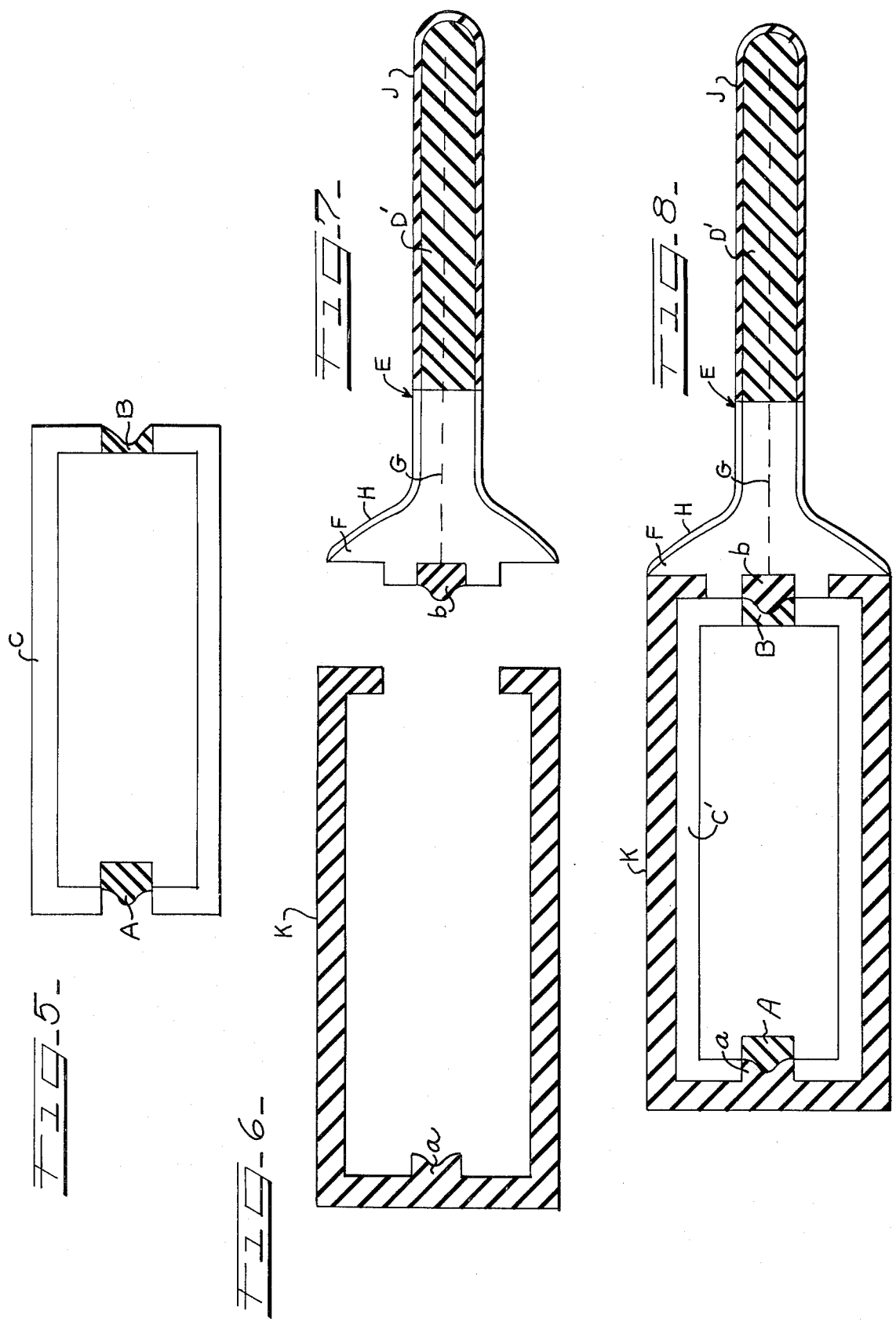

DETECTING SMALL POTENTIAL DIFFERENCES IN A MAMMALIAN BODY

This application is a continuation-in-part of our co-pending application Ser. No. 318,083 filed Dec. 26, 1972, now abandoned.

The present invention relates to apparatus and method for the detection, amplification and indication of small potential differences, such as for example those present in mammalian bodies.

It has been found that the bodies of mammals generate electrical potentials which may be monitored by electrodes applied either externally or by insertion in body orifices. Thus the generation of minute electropotentials appears to reflect their overall metabolic activity, as well as the exchange of hydrogen ions and electrolytes with their environment.

In human mammals one of the areas with acid secretory epithelial surfaces is the vaginal epithelium.

It is among the objects of the present invention to provide apparatus by which the aforementioned minute electropotentials may be detected and amplified for diagnostic purposes.

It is another object of the present invention to amplify any potential differences detected by probe means and to identify the sign of the potential of one of the probe contacts with respect to that of another of the probe contacts.

It is a further object of the present invention to provide apparatus for the detection, amplification and identification of the polarity of low potential differences, in which the apparatus includes a differential amplifier, two trigger units connected to the output of the amplifier, one trigger unit being adapted to be actuated by potentials greater than a certain threshold which is positive with respect to ground and the other trigger unit adapted to be actuated by potentials less than a certain threshold which is negative with respect to ground, and an indicator means connected to each of the trigger units to indicate when the associated trigger unit has been actuated.

It is yet another object of the invention to provide a unit for actuating a signal for example a visible signal such as from a lamp if the voltage of the power supply to the amplifier trigger unit, or a lamp driving unit, drops or fails.

It is yet another object of the invention to provide a method of detecting, amplifying and identifying the polarity of low potential differences between two locations on a mammalian body, comprising locating two contacts on or in the body, amplifying any potential differences between the contacts, feeding the amplified signal to a pair of trigger units, one of which is actuated by potentials greater than a certain threshold which is positive with respect to earth and the other of which is actuated by potentials less than a certain threshold which is negative with respect to earth and finally identifying the trigger unit, if any, which has been actuated.

The principle uses of the apparatus and method according to the invention are for the detection of ovulation, oestrous, menopause and pregnancy in mammals, but also it can be used for the electrical detection of pathology, the detection of acupuncture points and skin potential differences and pre-ovular CNS potential indication from forehead and eye.

The potential of the vagina with respect to an electrode placed elsewhere on the body is normally 10–25 mV negative, but this potential may fall to zero or reverse in sign when ovulation occurs. It is moreover the property of vaginal secretions to react with base metals and so to generate electrical potentials. A base metal probe inserted in the vagina will react with vaginal secretions to to generate "contact potential," which will occlude vaginal potentials which it is intended to detect. By detecting this change it is possible to determine the onset of ovulation and hence to control fertility.

It is thus a further object of the invention to provide apparatus which includes a body contact to connect with the skin surface of a mammal with respect to which the potential difference of the vagina is being measured, and that the vaginal probe and body contact be connected to apparatus for the amplification and/or identification of potential differences.

Preferably the materials used in the conductive areas or sections of the probe are non acid-reactive conductive materials such as for example, carbon, or carbon impregnated materials for example, conductive polymers, conductive rubber, conductive silicone rubber or conductive plastic.

Preferably the materials used in the non-conductive areas or sections of the probe are non acid-reactive, non conductive materials such as for example, polymers, rubber or silicone rubber, or plastic.

Electrical connections in or on any part of the probe, for attachment and connection to the potential indicating apparatus may be constructed out of any conductive material.

Materials used in the construction of the body contact may be either acid reactive or non acid reactive. The conductive sections of the body contact may be constructed out of carbon impregnated polymer such as for example, conductive rubber, conductive silicone rubber or conductive plastics, alternatively carbon may be used.

It is yet another object of the invention to provide a vaginal probe which may be a rod or tube of dimensions suitable to the dimensions of the vagina for which its use is intended, preferably constructed so that the terminal section, which on insertion is intended to lie within the vagina, is conductive, for the purpose of detecting the vaginal potential, whereas the remainder of the probe which protrudes through the vulva is non conductive for the purpose of avoiding electrical short circuit between the vagina and the external body surface.

To facilitate this design, the vaginal probe may be constructed in two parts with a conductive terminal section bonded to a non conductive basal section. Alternatively the entire probe may be constructed out of non conductive material with the terminal section coated, plated, surfaced or impregnated with conductive material which would be connected to the apparatus for indicating the potential difference by insulated electrical conductors. Alternatively the entire probe may be constructed out of conductive material with all but the terminal section and electrical connections on the basal section, covered, surfaced, or impregnated with an insulation of non conductive material.

The basal section of the vaginal probe may be flanged to prevent over penetration of the probe.

The body contact may take the form of a search probe with a conductive tip or terminal section and a non conductive handle, to be pressed against an exposed skin surface. The electrical apparatus for identifying the potential difference may constitute the handle of the body contact probe.

Alternatively the body contact may take the form of a conductive rubber sucker to be applied to an exposed skin surface.

Alternatively the body contact may take the form of a conductive rubber teat cup to make electrical contact with the mammalian teat or udder.

Alternatively the body contact may take the form of a conductive hand grip to be grasped by the user of the apparatus. The conductive hand grip may be a handle attached to the apparatus, alternatively it may be a conductive housing of the apparatus for identifying the potential difference, or a conductive handle to the vaginal probe.

In all embodiments of the invention, the conductive section or area of the body contact must be insulated from the conductive section or area of the vaginal probe.

Alternatively any part or section of the apparatus or housing thereof may be conductive, and being insulated from the vaginal probe, may constitute the body contact.

Two conductive layers, separated by an insulating layer may constitute vaginal probe and body contact respectively. A finger sheath with an inner conductive polymer layer separated from an outer conductive polymer layer by an insulating layer may constitute body contact and vaginal probe, respectively, when each conductive layer is separately connected to apparatus for the identification of potential differences, between them.

The vaginal probe and/or body contact may be attached to the apparatus for identification of the potential difference between them.

The vaginal probe and/or body contact may be attached to the apparatus for identification of the potential difference between them by electrical insulated leads. Alternatively they may either or both be rigidly, or rigidly but detachably, connected to the apparatus for identifying the potential difference between them.

The handle of the vaginal probe may be in whole or part, conductive and so constitute the body contact, and may contain the electrical apparatus for identifying the potential difference between them, thus would be constructed a preferable embodiment of the invention.

Three other body contacts may be utilised as follows:
1. a narrow belt or strap lined with the conductive silicone rubber, making an inert contact with the body, and being placed round the lower abdomen,
2. a second belt of a construction similar to the first belt, being located around the upper part of the leg,
3. metal or silicone rubber contact for the hand connected either to the handle of the vaginal probe, insulated from the vaginal contact, or attached to the case of the instrument where it is held.

One embodiment of the invention is diagrammatically illustrated, by way of example, with reference to the accompanying drawings, in which:

FIG. 1 is a schematic diagram of one form of the apparatus and forming a first member thereof;

FIG. 2 is a circuit diagram of the amplifier which is part of the first member;

FIG. 3 is a circuit diagram of a trigger unit of the first member;

FIG. 4 is a circuit of a lamp driving unit of the first member;

FIG. 5 shows schematically the first member with connections for second and third members of the apparatus;

FIG. 6 shows a body contact which is a conductive housing of the first member;

FIG. 7 shows a vaginal probe which comprises a third member; and

FIG. 8 shows the three members assembled.

In the drawings, conductive parts are shown cross-hatched. Referring now to the drawings, the potential difference generated by the mammalian body is transmitted to a high gain differential D.C. amplifier 1. The amplifier, as shown in FIG. 2, has one of the inputs A from a vaginal probe (FIG. 7) connected to ground through the leg. When a potential exists between the inputs A and B (FIGS. 2 and 5), the amplifier will amplify the difference whether or not the difference is positive or negative.

The positive or negative amplified difference is then applied to the single output C.

The amplifier may be provided with means D for adjusting the zero of the amplifier.

Connected to the output of the amplifier are two trigger units 2 and 3, one of which 2, is responsive to potentials greater than a certain threshold which are positive with respect to the leg (ground) input A, and the other 3, is responsive to potentials which are less than a certain threshold which are negative with respect to the ground input A.

Connected to each of the trigger units 2 and 3 are separate lamp driving units 4 and 5.

When a trigger unit 2 and 3 receives a potential above a certain threshold which actuates it, it supplies a potential at its output, thus actuating the corresponding lamp driving unit and illuminating the corresponding lamp 4A or 5A.

Thus when the lamp 4A lights there is a positive potential at the input B, with respect to the ground input A.

The trigger units are preferably variable threshold Schmitt triggers.

The unit 6 is a zener diode voltage comparator. If there is a drop in the power supply voltage below a predetermined limit then a light will be turned on, so as to indicate a failure in the power supply. This is desirable when batteries are used as the power supply.

The size of the first member C' depends upon the bulk of the electrical components. The third member, the detachable vaginal probe E, D' is of dimensions suitable for the vagina of the mammal for which the use of the apparatus is intended. The dimensions should be such that when the flange F on the probe E, D' makes contact with the vulva, the tip of the probe on the section D', makes contact with the cervix. The diameter of the probe E, D' should correspond to the internal dimensions of the resting vagina such that optimal surface contact without undue distension is obtained.

The first member C' of the apparatus, (FIG. 5) being its electrical components, has connections at A, and B, which represent body contact and probe input respectively. The member C' is a non conductive housing to the electrical components for identifying the potential difference between A and B, to which a body contact (the second member, FIG. 6) and vaginal probe are connected, through A and B respectively, via electrical leads (not shown).

The second part of the apparatus, (FIG. 6) the body contact K, is a conductive housing of member C', and is a detachable conductive rubber or conductive silicone rubber housing with a complementary connection $a$ to connect electrically with A. Alternatively the second member could represent a non conductive housing of member C' of the apparatus, with a and A representing separate body contact electrical input. This alternative could apply to the embodiment of the invention for animal application where the user of the apparatus, being human, wished to avoid making body contact on behalf of the animal, rather to connect a separate body contact to the skin of the animal. Such a separate body contact may be attached to the first part via electrical leads or it may be rigidly and or detachable attached to the rest of the apparatus.

The third member (FIG. 7) of the apparatus is the vaginal probe which has a conductive terminal section D', of conductive rubber or conductive silicone rubber. The basal section E of the probe, is non conductive being of rubber or silicone rubber.

G represents a conductive core to the probe, connecting the conductive area D' to the first member via a complementary connection b, core-G may be a metal rod or spring which will also stiffen the probe.

The connection b provides both mechanical and electrical connection at B with the first member, and may be for example a screw, plug, pop or clip device, either B or b being a male or a female fastening.

The assembly of the three members of the apparatus is shown in FIG. 8 with the detachable probe in position. It will be understood that the apparatus would incorporate any necessary access to the electrical components in the member C', (FIGS. 1–5) either in whole or in part, for instance access to batteries, switches and adjustments would be available in the first member C' either through the second member or on removal of the second member. FIG. 8 also serves to illustrate insulation between the second member K of the apparatus and parts D', G, and b of the third member.

A further embodiment of the invention, not illustrated, comprises a vaginal probe and handle, each being conductive but connected to one another and insulated from one another by a non conductive section. The electrical apparatus for indicating the potential difference between probe and handle would comprise a micro, solid state, electrical insert in the handle.

The vaginal probe in any embodiment of the invention may be covered in a sheath which is conductive where it covers the conductive section D' of the probe, but non-conductive where it covers the non-conductive section E of the probe. The conductive section of J the sheath would preferably be non acid reactive carbon, or carbon impregnated material such as conductive polymer, conductive rubber, conductive silicone rubber or conductive plastic. The remainder H of the sheath especially where it covers the non conductive section of the probe would be of non conductive material.

An alternative means of identification of potential differences such as for example, those present in or on mammalian bodies, is the use of the apparatus hereinbefore described to return a potential difference to the mammalian body or bodies, through either or both the orificial probe and/or body contact respectively to balance the potential generated by the body using an electrical balance means to generate and measuring the balancing potential as the electrical apparatus included in the invention.

The probe can be connected to the apparatus as a rigid fixture, so that the apparatus becomes a handle for the probe.

By monitoring the minute electropotentials over a period of time, and recording them over several days, changes in metabolic activity during ovulation can be detected so that fertility can be controlled since it has been proved that the electrovaginal potential readings reflect ovarian activity, and the discontinuity of activity in the electropotentials coincides with ovulation (Annals New York Academy of Sciences, p.237,83(2), 1959).

The apparatus may be used for diagnostic purposes other than those associated with ovulation, such as the detection of body potentials, the absence of which generally indicates death.

To detect the cessation of brain potentials, checks are made, (1) across the skull forehead to occiput and (2) transparietal, heart potential checks (1) from left hand to right hand and (2) left hand to right foot.

We claim:

1. A system for detecting small direct current electrical potential differences between the vagina of a mammal and another location of the body of said mammal spaced from the vaginal region, comprising an electrical circuit means for detecting, amplifying and identifying the polarity of said potential difference, said circuit means having two input terminals across which said small potential difference may be applied, an elongated vaginal probe adapted to be inserted in the vagina, said probe comprising an electrically conductive section at its terminal end, an adjacent section of insulating material at the other end, and electrically conductive means passing through said insulation section and forming an electrical connection between said conductive section and one of said terminals, a thin removable sheath of electrically conductive rubber material disposed over the electrically conductive section of said probe, and means forming an electrical connection between the other location on said body spaced from the vaginal region and the other of said input terminals.

2. Apparatus, as claimed in claim 1, wherein said last named means comprises an electrically conductive hollow cylindrical member disposed adjacent the insulation section of said probe on the end opposite the conductive section and adapted to provide a hand held electrode handle for the probe, whereby the holding hand constitutes the other location on the body, said member being constructed of a conductive material taken from the group consisting of metal, carbon and conductive polymer, and means forming an electrical connection between said member and said other of said input terminals.

3. Apparatus, as claimed in claim 2, wherein said member contains and supports a nonconductive cylindrical housing containing said electrical circuit means, said housing having openings on opposite ends thereof providing access to said input terminals.

4. Apparatus, as claimed in claim 2, wherein the insulation section of said probe has a flanged configuration of gradually increasing diameter as it extends towards the handle member to prevent over penetration of the probe and to provide insulation between the handle member and the body region adjacent the vagina, and wherein said sheath of rubber material has a nonconducting extension disposed over the insulation section of said probe.

5. A system for detecting small direct current electrical potential differences between the vagina of a mammal and another location on the body of said mammal spaced from the vaginal region, comprising an electrical circuit means for detecting, amplifying and identifying the polarity of said potential difference, said circuit means having two input terminals across which said small potential difference may be applied, an elongated vaginal probe adapted to be inserted in the vagina, said probe comprising an electrically conductive rubber material section at its terminal end, an adjacent section of insulating material at the other end, and an electrically conductive metal rod passing axially and centrally through said insulation section and substantially the entirety of said electrically conductive rubber material section in order to structurally stiffen the probe, means forming an electrical connection between said metal rod and one of said input terminals, and means forming an electrical connection between the other location on said body spaced from the vaginal region and the other of said input terminals.

* * * * *